Oct. 17, 1961 F. C. HUND 3,004,474
ROUND INSPECTION MIRROR
Filed Nov. 12, 1958
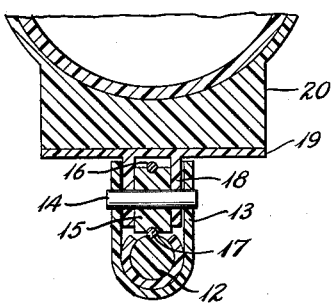
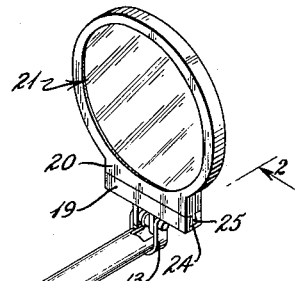
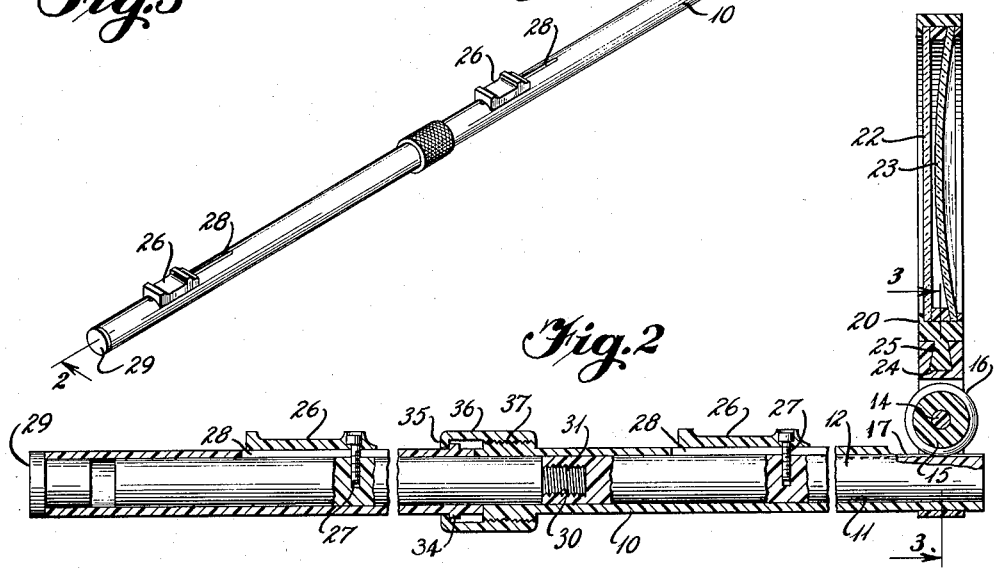
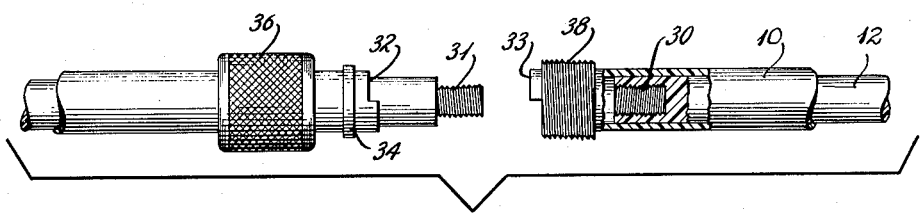
INVENTOR
F.C. HUND
BY
ATTORNEY

United States Patent Office 3,004,474
Patented Oct. 17, 1961

3,004,474
ROUND INSPECTION MIRROR
Frank C. Hund, 1227 Saturn Drive, Nashville, Tenn.
Filed Nov. 12, 1958, Ser. No. 774,799
4 Claims. (Cl. 88—97)

This invention relates to the critical and minute inspection of objects of various kinds and from multiple viewpoints including from a position where accessibility is difficult due to the area to be inspected being relatively low, where there is small clearance or visibility is through a limited area.

The invention is directed specifically to inspection equipment including mirror surfaces capable of being held in the hand and with the mirror surfaces at a distance from the portion held as well as to equipment in which the angularity of the mirror can be changed by the same hand in which it is held, with the mirror used to reflect light onto the area desired to be inspected thereby to illuminate such area and facilitate inspection thereof.

With the progress of the present era including developments in aircraft as well as in other fields there are areas within motors, wings, panels or the like structures where inspection is difficult. Also certain of these areas are exposed to high tension electrical impulses as well as to stress and strain.

The present invention is a further development of that disclosed in Patent 2,852,979 granted September 23, 1958, which effectively performs the function for which it was designed, however, the mirror of the patent is of undesirably limited use being relatively short, frail and including undesirable metal parts which in fact are dangerous where used in the electrical fields.

It is an object of the invention to provide a relatively simple, inexpensive, and practical inspection device having a relatively strong durable handle one end of which is adapted to be gripped in the hand and with an angularly adjustable mirror mounted on its other end in a manner that its angular position can be varied by the hand in which it is held.

Another object of the invention is to provide a non-metallic handle of the kind described which is tubular and in which is mounted a slidable rod or core with each of said handle and contained rod composed of single or multiple segments or parts and so arranged that one end of the tube can be gripped and the thumb employed to move the rod or core longitudinally within the tube and with cooperatively engageable means on one of the cores and tubes for movably supporting a mirror or other implement the angularity of which can be varied to suit requirements.

A further object of the invention is to provide an inspection device including a tube of one or more cooperative lengths and a relatively movable rod or core also of one or more cooperative lengths slidably but non-rotatably received therein, such cooperative lengths being relatively non-rotatable, and with an inspection portion pivotally mounted on one end of the rod and tube and having means to frictionally engage the other so that angular movement of the inspection portion will be accomplished.

Other objects and advantages of the invention will be apparent from the following description taken in conjunction with the accompanying drawing, wherein:

FIG. 1 is a perspective illustrating one application of the invention;

FIG. 2, an enlarged fragmentary detailed section on the line 2—2 of FIG. 1;

FIG. 3, transverse section on the line 3—3 of FIG. 2; and

FIG. 4, an enlarged fragmentary exploded side elevation of the joint between the handle and the extension.

Briefly stated, the inspection device of the present invention comprises a support of tubular form adapted to be gripped in the hand along one end, and having mounted on the other end an angularly adjustable tool, such as for example oppositely disposed plain and curved mirror surfaces and with means for swinging said mirror to adjust its angularity, the swinging movement being accompanied by a friction connection between the tool and a rod disposed lengthwise within the tube, such rod being of a size to fit snugly and slidably within the tube so that the rod and tube reinforce each other. A rod operating portion is located externally along the tube and connected to the rod so that such operating portion may be engaged by the thumb and moved endwise to impart corresponding movement to the rod to cause the swinging of the mirror. Also the tube may be made of one or more sections and where multiple sections are employed they may be joined in any desired manner, the tube being connected by a flanged threaded coupling and the rod being connected by a threaded coupling, the entire device being devoid of metal.

With continued reference to the drawing, the inspection device of the present invention is composed of a tube 10 of non-conductive material such as plastic or the like, the interior 11 of such tube being of uniform diameter throughout its length and in which is received a core or rod 12 of a diameter to fit snugly and slidably within the tube so that each provides support for the other making it possible to employ a small tube with high tensile strength.

On one end of the tube are disposed a pair of spaced lugs 13 which extend transversely and provide a support for a pivot in the form of a non-metallic pin 14 of nylon or other material on which is pivoted or oscillatably mounted a bearing 15 carrying one or more of the friction rings or bands 16, the outer surface of each of which is transversely convexly curved and fits within a longitudinal groove 17 on the rod 12 providing cooperative engagement between the ring and the rod such that when the rod is moved endwise, the ring will be rotated and with it the bearing 15. A pair of arms 18 are fixed to or mounted to rotate with the bearing 15 so that they will swing about the pin 14.

Attached to the pair of arms 18 is a tool holder comprising a supporting portion 19 and a supported portion 20 carrying a tool 21 in the form of a mirror having flat and curved surfaces 22 and 23. The supporting portion 19 is provided with a dove-tail groove 24 in which is slidably disposed a dove-tail 25 attached to the portion 20.

The tube 10 may be of any desired length with the tool on one end and the other end forming a handle by which the tube can be gripped. In order to move the rod endwise to swing the tool relative to the handle, a finger piece 26 may be provided on the exterior of the tube and with a non-conductive connection 27 to the rod 12, in the form of a stud or screw such finger piece preferably being disposed in a position to be conveniently negaged and moved axially of the tube by the thumb of the hand in which the device is held; the tube being provided with a slot 28 through which connection the screw extends.

If desired the end of the tube, which is adapted to be held in the hand, may be provided with a closure 29 fitting frictionally into and about the end portion of the tube to exclude foreign matter.

The handle may be made longer by coupling additional tube and rod members thereto, the rod members each having an internally threaded socket 30 in which is received an externally threaded rod portion 31, while the tubes may have inter-fitting portions of any desired character, as for example, stepped semi-circular portions 32 and 33 and with an externally knurled enlargement or flange 34 adapted to be engaged by the inturned end 35 of a sleeve 36 having interior threads for cooperative engagement with external threads 38 on the adjacent tube section 10, such parts being employed to fasten the parts together in end-to-end relation. Where a second tube is added to provide an extension of the handle such tube will have a thumb engaging portion the same as the first tube and an operating rod to oscillate the mirror and tool.

It will be apparent from the foregoing that, an inspection device is provided in which a rod is mounted within a tube so that one reinforces the other making it possible to produce a device of minimum size commensurate with strength, and that this handle portion may be of any desired length with an operating portion or finger piece conveniently located for ready engagement by the thumb of the hand in which the device is held and that by the manipulation of such operating portion a tool such as a mirror mounted on the end of the tube remote from the end by which it is held may be rotated to different angular positions.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. An inspection mirror comprising a tube, a mirror pivotally mounted on one end of said tube and with the other end of said tube forming a gripping portion, a rod slidable within the tube connected with the mirror to move the mirror about the pivot on shifting of the rod, said tube and rod being composed of multiple segments including threaded coupling means between the segments of the rod and also between the segments of the tube, each segment of the rod having a stud extending through a longitudinal slot in the associated tube segment, and a finger piece fastened to each stud exterior of the tube.

2. An inspection device comprising a tube and a rod slidable within said tube, an inspection instrument pivoted on said tube adjacent one end, a friction connection between said inspection instrument and said rod to cause pivotal movement of said inspection instrument on said tube on movement of the rod, said tube being composed of multiple segments detachably connected together and said rod being likewise composed of multiple segments detachably connected together, each segments of rod being provided with a rod driving connection extending through a slot in the associated tube section, the end of said tube remote from said inspection instrument being adapted to be gripped during the use of the inspection instrument.

3. An inspection mirror comprising a non-metallic tube, a rod of a size to fit snugly and slidably endwise within said tube, a mirror pivoted on said tube adjacent one end thereof, the other end of said tube being adapted to be gripped in the hand, a friction ring about the pivot on which said mirror is mounted, said friction ring having a transversely curved surface, said rod having a transversely curved groove receiving said ring and adapted when moved endwise to cause the rotation of said ring and mirror, said tube and rod being composed of multiple segments non-rotatable with respect to each other, each rod segment having a connection extending through a slot in each corresponding tube section and each connection having an operating portion on said tube for engagement by the thumb for producing movement of said rod.

4. An inspection device comprising a tube, a mirror pivotally mounted at one end of said tube, a rod slidable longitudinally within the tube and connected in driving engagement with the mirror to pivot the same, said tube and rod being composed of multiple segments, at least one rod segment having a stud extending through a slot in an associated tube segment, a finger piece exterior of the tube mounted on the stud, the rod segments being joined together by a screw threaded at one end of one rod and a threaded socket on the adjoining rod receiving the screw thread of said one rod, said tube segments being joined in non-rotatable relationship by a screw thread on one end of one tube section, a flange on the end of an adjoining section, a coupling sleeve engaging the flange and threaded on the screw thread of the first section, and stepped interfitting semi-circular portions respectively on the ends of each of the adjoining tube portions.

References Cited in the file of this patent

UNITED STATES PATENTS

| | | |
|---|---|---|
| 1,036,000 | Pease | Aug. 20, 1912 |
| 2,852,979 | Hund | Sept. 23, 1958 |